United States Patent [19]

Tanaka

[11] Patent Number: 5,212,820
[45] Date of Patent: May 18, 1993

[54] TAPE LOADING APPARATUS FOR DRAWING MAGNETIC TAPES

[75] Inventor: Seiki Tanaka, Kanagawa

[73] Assignee: Sony Corporation, Japan

[21] Appl. No.: 631,487

[22] Filed: Dec. 21, 1990

[30] Foreign Application Priority Data

Dec. 26, 1989 [JP] Japan ................. 1-337539

[51] Int. Cl.⁵ ........................................... G11B 15/665
[52] U.S. Cl. ...................................................... 360/85
[58] Field of Search ..................................... 360/85, 95

[56] References Cited

U.S. PATENT DOCUMENTS

| | | | |
|---|---|---|---|
| 4,056,833 | 11/1977 | Schulz ................................. | 360/85 |
| 4,357,639 | 11/1982 | Hama et al. ........................ | 360/85 |
| 4,652,948 | 3/1987 | Umeda ............................. | 360/85 X |
| 4,751,592 | 6/1988 | Hutter et al. ..................... | 360/85 X |
| 4,884,153 | 11/1989 | Ahn ..................................... | 360/85 |

FOREIGN PATENT DOCUMENTS 384686 12/1987 Austria .
3412527 10/1984 Fed. Rep. of Germany .
0050516 11/1983 Japan .

Primary Examiner—John H. Wolff
Assistant Examiner—Paul J. Ditmyer
Attorney, Agent, or Firm—Ronald P. Kananen

[57] ABSTRACT

A tape loading apparatus in which a rotation of a motor is transmitted to a loading ring using a planetary gear arrangement, a loading mechanism is operated as the loading ring is moved to a tape loading position and the loading ring is locked at the tape loading position by a locking mechanism. When the motor is reversely rotated, the lock mechanism releases the loading ring. When the loading ring is released, the gear change action of the planetary gear unit causes, in turn, the rotation of the motor to be transmitted to the loading ring. Thus, the loading ring can be rotated in the unloading direction.

4 Claims, 5 Drawing Sheets

TAPE LOADING APPARATUS FOR DRAWING MAGNETIC TAPES

BACKGROUND OF THE INVENTION (1) Field of the Invention

The present invention relates to a VTR (Video Tape Recorder) and relates particularly to a tape loading apparatus which can load and unload magnetic tapes utilizing a loading ring.

(2) Background Art

A tape loading apparatus using a loading ring generally includes a motor by means of which a tape loading ring is rotated by means of a rotational transmission mechanism to carry out tape loading and unloading. Generally such an apparatus engages an epicyclic gear to effect tape loading.

A conventional rotational transmission mechanism generally includes: a rubber belt, one end of which is suspended on a rotational axis of a motor; the other end of the rubber belt engages a worm gear; the worm gear meshes with a worm wheel; a pinion gear mounted on the worm wheel meshes with a gear surface provided on an outer circumferential surface of the loading ring. When a rotational axle of the motor is rotated in one direction, the loading ring is rotated in a loading direction (arrow marked direction) via the rubber belt, worm gear, worm wheel, pinion, and gear surface. When the loading ring is rotated to a tape loading end position, a stopper pin installed on a lower surface of the loading ring is contacted with a positioning pin installed on a chassis and the rotation of a loading ring is stopped to complete the tape loading. (Refer to a Japanese Patent Utility Model Registration Second Publication No. Showa58-50516 published on Nov. 17, 1983).

In the above-described tape loading apparatus, a rubber belt is used so that when the stopper pin is contacted with the positioning pin at the chassis side, the belt slips, serving as a so-called limiter. In addition, the worm and worm gear are used as a loading ring mechanism so that the stopper pin is maintained in a state where the stopper pin is pressed against the positioning pin.

The following problems arise in the previously proposed tape loading apparatus:

(1) Since both a worm and worm gear wheel are used, transmission of rotational force from the motor is less efficient.

(2) When utilizing a worm and worm gear wheel, locking of the loading ring is not secure, and a relatively large force must be applied to the loading ring to reverse loading ring direction.

(3) The rubber belt lacks durability, and must be replaced regularly, so maintenance becomes troublesome.

Another tape loading apparatus using an epiciclic gear is exemplified by a U.S. Pat. No. 4, 884, 153 issued on Nov. 28, 1989. This loading device is cumbersome and expensive to manufacture as well as being more prone to breakdown than simpler loading devices.

SUMMARY OF THE INVENTION

It is an object of the present invention to provide an improved tape loading apparatus in which, in place of a rubber belt, worm wheel, or worm gear, a lock mechanism is used for both the loading apparatus of the epicyclic gear and, loading ring. The lock mechanism is operated via an epicyclic gear by means of a motor when tape unloading is effected, to unlock the loading ring. Due to action of the gear along the loading ring, the loading ring is rotated so that lock release and rotation of the loading ring can continously be performed.

This can be achieved by providing a tape loading apparatus for drawing magnetic tape from a mounted tape casette in which magnetic tape is wound around a circumferential surface of a tape guide drum comprising: a loading ring on which a first pin is mounted so that said loading ring is stopped thereby at a first loading start position; a second pin for stopping a rotation of said loading ring at a second position at which a loading operation is completed; a motor; means for transmitting rotation of said motor to said loading ring; and, lock means having first and second levers for locking said first pin at a position where said first pin is engaged by the first and second levers, and at least one of said first and second lever contacts said second pin.

DETAILED DESCRIPTION OF THE PREFERRED EMBODIMENT

Reference will hereinafter be made to the drawings in order to facilitate a better understanding of the present invention.

Figure 1:
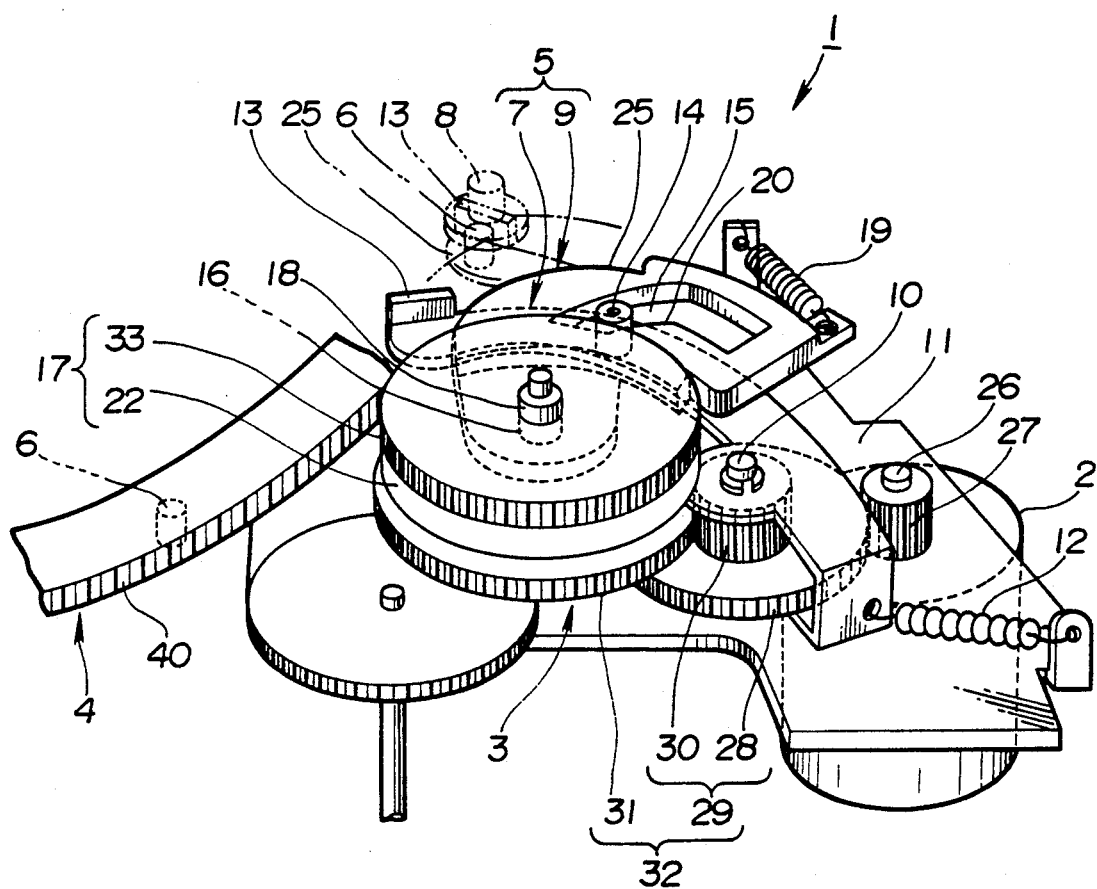
FIG. 1 is a perspective view of a tape loading apparatus of a preferred embodiment according to the present invention.
Figure 2:
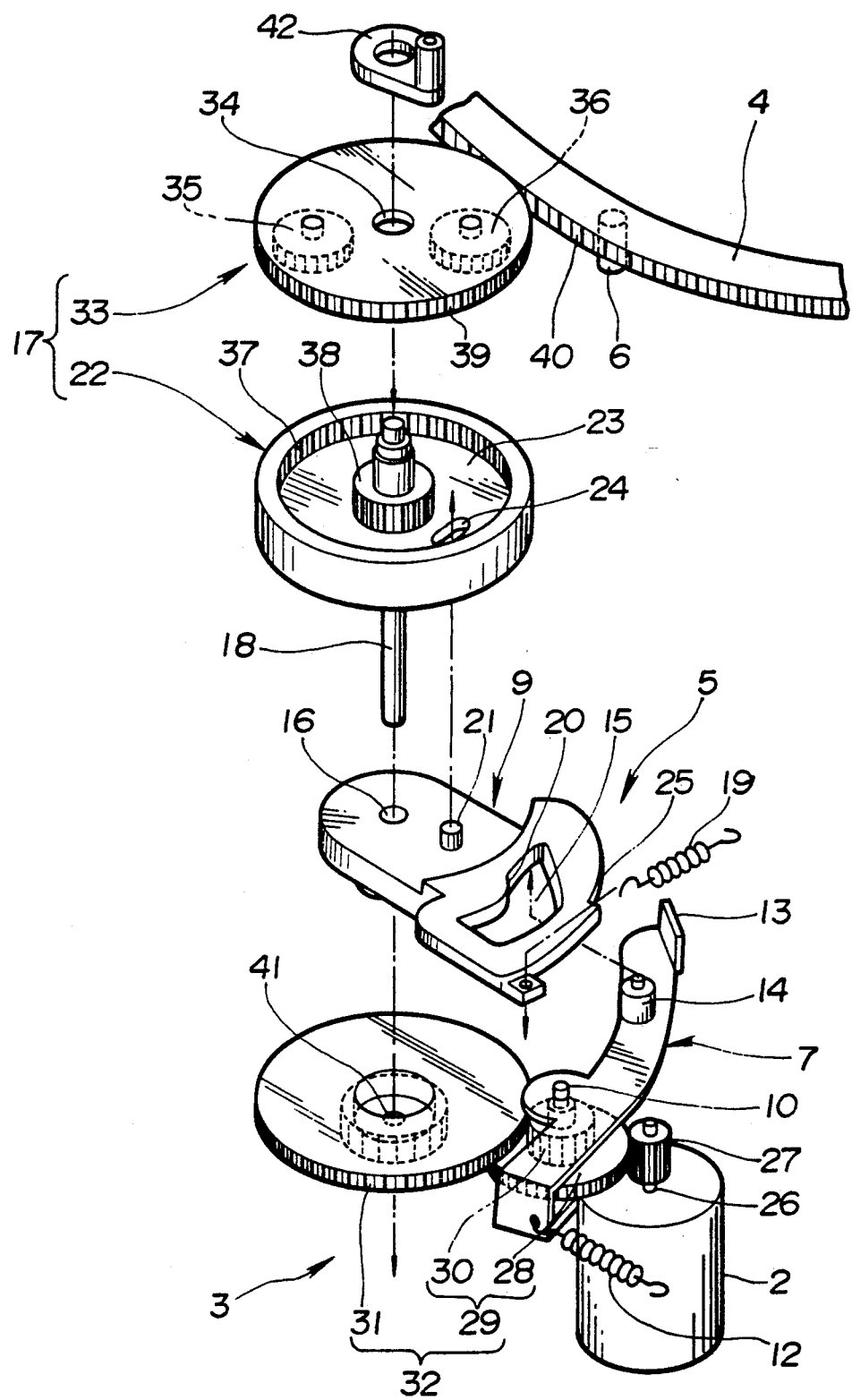
FIG. 2 is an exploded perspective view of the tape loading apparatus shown in FIG. 1.
Figure 3:
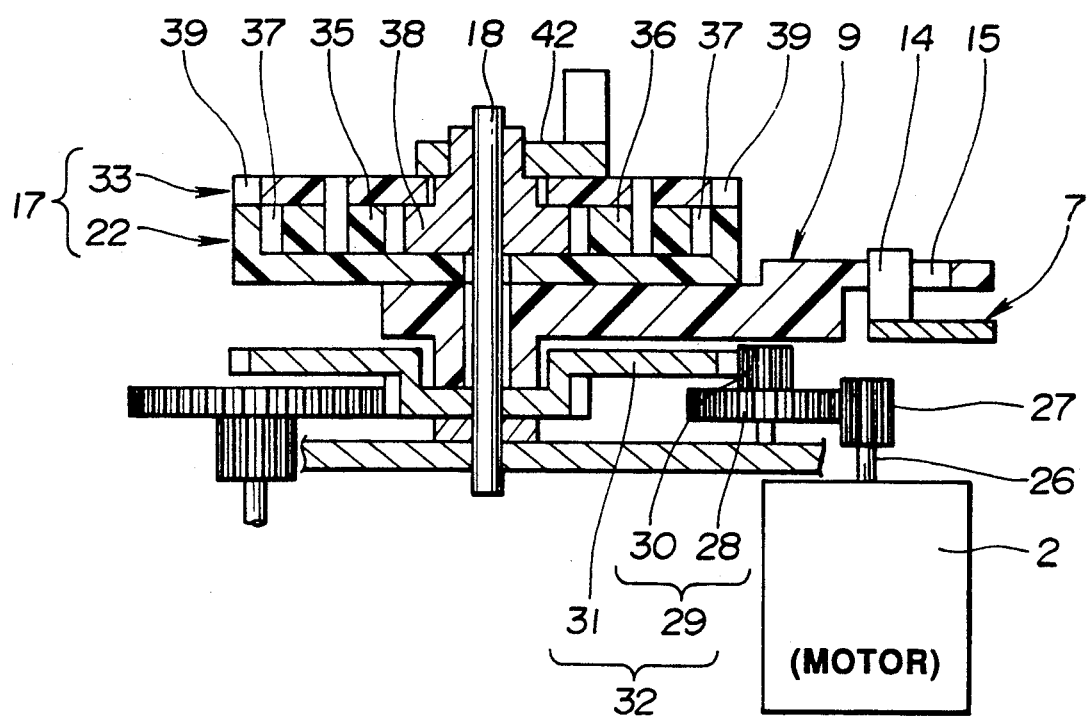
FIG. 3 is a cross sectional view of the tape loading apparatus.

FIGS. 1 through 5 show a tape loading apparatus in a preferred embodiment according to the present invention. In FIGS. 1 and 2, the numeral 1 generally denotes a tape loading apparatus.

The tape loading apparatus 1 rotates a loading ring 4 via a rotational transmission mechanism 3. When the loading ring 4 rotates to a tape loading position, a lock mechanism 5 causes the loading ring 4 to lock.

The lock mechanism 5 includes: a) a trigger lever 7 which is pressed by a stopper pin installed on a lower surface of the loading ring 4 when the loading ring 4 is rotated to a vicinity of a loading end position; and b) a lock lever 9 for positioning the loading ring 4 at a tape loading position with the stopper pin pressed against a positioning pin 8 installed on a chassis.

The trigger lever 7 is pivotally supported on a tape loading mechanism frame 11. In addition, rotational force in a counterclockwise direction (as viewed from FIG. 1) is applied thereto by means of a coil spring 12 engaged with one end of the trigger lever 7. A pin contacting portion 13 is installed on the other end of the trigger lever 7. The stopper pin 6 installed on the loading ring 4 is contacted with the pin contacting portion 13. A roller 14 is installed between the pin contacting portion 13 and an axle 10. The roller 14 is fitted into a roller fitting bore 15 installed on the lock lever 9.

The lock lever 9 has one end provided with a bearing hole 16. The lock lever 9 is pivoted with a main axle 18 of a planetary gear unit 17 as a center. The lock lever 9 has the other end engaged with a coil spring 19. The lock lever 9, thereby, receives pivoting force in the counterclockwise direction by means of the spring force of the coil spring 19.

In addition, the roller fitting bore 15 is formed substantially arc shaped with the main axle 18 as the center. One end of its internal circumferential surface is formed with a step portion 20 for engaging the roller 14. The step portion 20 is engaged with the roller 14 so as to block the pivoting of the lock lever 9 in the counterclockwise direction.

As shown in FIG. 2, an internal tooth wheel engaging pin 21 is installed between the lock fitting bore 15 of the lock lever 9 and bearing hole 16 so as to be inserted into an elongated hole 24 installed on a bottom surface 23 of the internal tooth wheel 22 of the planetary gear unit 17.

The structure of the lock mechanism 5 in the preferred embodiment is as described above. When the loading ring 4 is rotated in the vicinity of a loading end position, the stopper pin 6 installed on a lower surface of the loading ring 4 is contacted with the pin contacting portion 13 of the trigger lever 7. When the trigger lever 7 is pivoted in the clockwise direction, the roller 14 installed on the trigger lever 7 is disengaged from the step portion 20 installed on the internal circumferential surface of the roller fitting hole 15. The lock lever 9 is pivoted in the counterclockwise direction by means of the spring force of the coil spring 19. A stopper pin pressing surface 25 located on one side portion of the lock lever 9, causes the pin contacting portion 13 to press against the positioning pin 8 with the stopper pin 6 grasped by the pin contacting portion 13 of the trigger lever 7 so that the loading ring 4 is positioned and fixed at the loading position.

Next, a structure of a rotational transmission mechanism 3 which transmits the rotational force of the motor 2 to the loading ring 4 will be described below.

The rotational transmission mechanism 3 includes a pinion 27 installed on a rotational axle 26 of the motor 2, double gears 29 having large and small diameters for deceleration in which a large diameter gear portion 28 thereof is meshed with the pinion 27, a reduction gear group 32 having a spur gear 31 meshed with the smaller diameter gear portion 30 of the double gear 29, and the planetary gear unit 17 which is rotationally operated via the reduction gear group 32.

The planetary gear unit 17 includes an internal tooth gear 22 rotatably mounted on the main axle 18, as shown in FIG. 2, and external tooth gear 33 rotatably mounted on the main axle 18, overlapped with the upper end surface of the internal tooth gear 22.

A lower surface of the outer gear wheel 33 is provided with a pair of planetary gears 35, 36 rotatably mounted thereon and placed symmetrically with the bearing bore 34 as the center. Outward facing surface portions of the planetary gears 35, 36 are meshed with the internal gear 37 mounted on the inner circumferential surface of the inner tooth gear 22. On the other hand, the inner facing surfaces of the planetary gears 35, 36 are meshed with the gear 38 fixed on the upper end of the main axle. The outer gear 39 installed on an outer circumferential surface of the outer tooth gear is meshed with a gear surface 40 installed on an outer circumferential surface of the loading ring 4.

Then, after the lower end of the main axle 18 is inserted into the bearing bore 16 of the lock lever 9, the lower end thereof is inserted into the bearing hole 41 of the spur 31 so as to rotate with the spur 31.

The operation of the rotational transmission mechanism and planetary gear unit 17 will now be described with reference to FIGS. 4 and 5.

Figure 4:
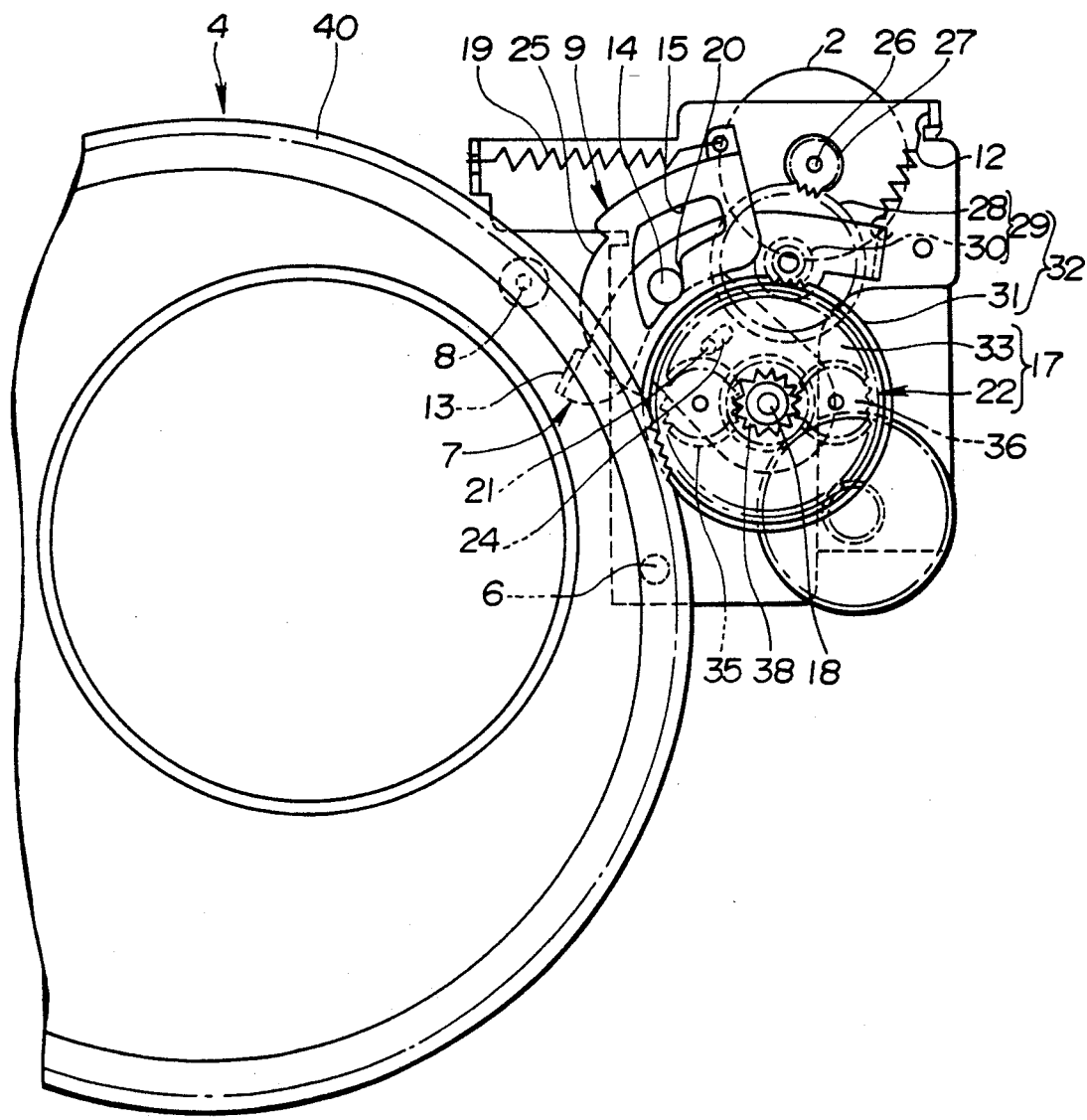
FIG. 4 is an plan view of the tape loading apparatus before a loading ring is locked.

FIG. 4 shows a state in which the stopper 6 installed on a lower surface of the loading ring 4 has been moved to the vicinity of the pin contacting portion 13 of the trigger lever 7 with the loading ring 4 rotated in the direction of the tape loading direction. That is to say, with the loading ring 4 placed at the tape unloading position, the motor 2 is rotated in the clockwise direction, the double gear 29 is rotated in the counterclockwise direction. Thus, the spur 31, meshed with the double gear 29, is rotated in the clockwise direction. Then, the main axle 18 inserted under pressure into the bearing bore 41 and gear 38 fixed on the upper end of the main axle 18 are rotated in the clockwise direction. Then, planetary gears 35, 36 meshed with the inner tooth gear 37 are rotated in the counterclockwise direction. The inner tooth gear 37 receives the rotational force from the planetary gears 35, 36. However, since the inner tooth gear engaging pin 21 installed on the lock lever 9 is inserted in the elongated hole 24 installed on the inner tooth gear 22, the lock lever 9 is locked so as not to rotate in the counterclockwise direction since the step portion 20 is engaged with the roller 14 installed on the trigger lever 7.

Hence, since the inner tooth gear 22 is not rotated, the planetary gears 35, 36 are pivoted in the clockwise direction with the main axle 18 as a center, rotating in the clockwise direction. The outer tooth gear 33 on which the planetary gear is mounted is rotated in the clockwise direction so that the outer tooth gear 33 causes the loading ring 4 to rotate in the counterclockwise direction.

When the loading ring 4 is further rotated in the counterclockwise direction from a state as shown in FIG. 4, the stopper pin 6 is brought in contact with the pin contacting portion 13 of the trigger lever 7. Furthermore, when the loading ring 4 is rotated in the counterclockwise direction, the stopper pin 6 causes the pin contacting portion 13 to be pressed under pressure. The trigger lever 7 is pivoted in the clockwise direction against the biasing force of the coil spring 12. When the pin contacting portion 13 is pivoted toward a position at which it is contacted with the positioning pin 8 installed on the chassis, the roller 14 installed on the trigger lever 7 is disengaged from the roller engaging step portion 20 of the roller fitting hole 15. When the lock lever 9 is pivoted in the counterclockwise direction by means of a spring force of the coil spring 19, the stopper pin 6 and pin contacting portion 13 are pressed on the positioning pin 8 by means of a stopper pin pressing surface 25, on a side surface of the lock lever 9, as shown in FIG. 5. The pin 6 and contacting portion 13 correspond to a tape loading position of the loading ring 4.

It is noted that when an elongated hole 24 is installed on the inner tooth gear 22, the hole acts as the limiter so as to prevent breakage of the gear and so on.

Figure 5:
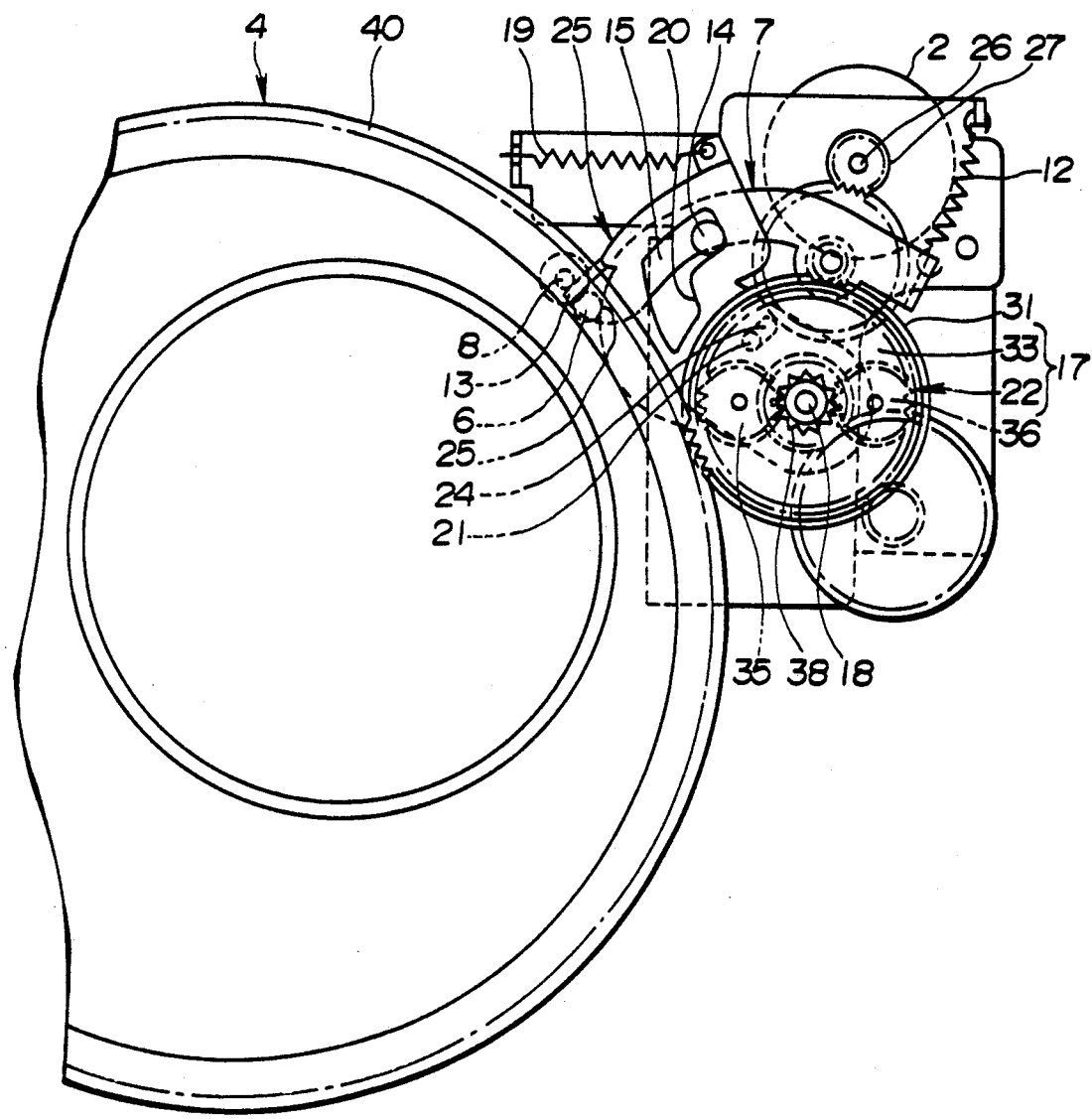
FIG. 5 is a plan view in which the loading ring is locked.

When the motor 2 is reversely rotated (in the counter clockwise direction) with the loading ring 4 in a locked state as shown in FIG. 5, the main axle 18 and the gear 38 fixed to the main axle 18 are rotated in the counterclockwise direction via the reduction gear group 32.

Then, the planetary gears 35, 36 meshed with the gear 38 are rotated in the clockwise direction. Since the loading ring 4 is locked, the outer tooth gear 33 meshed with the loading ring 4 does not rotate. Hence, the inner tooth gear 22 meshed with the planetary gears 35, 36 are rotated in the clockwise direction. The lock lever 9 installed on the inner tooth gear engaging pin 21 to be engaged with the elongated hole 24 installed in the inner tooth gear 22 is pivoted in the clockwise direction. Then, when the lock lever 9 is rotated through a predetermined angle in the clockwise direction, the step portion 20 of the roller fitting hole 15 installed on the lock lever 9 comes into the vicinity of the position of the roller 14. At this time, pressure on the stopper pin 6 by means of the stopper pin pressing surface 25 is released. Therefore, since the locking of the loading ring 4 by means of the lock lever 9 is released, the outer tooth gear 33 which was locked via the loading ring 4 is necessarily released. The outer tooth gear 33 is enabled to be rotated.

Counterclockwise rotation of the motor 2 is transmitted to the main axle 18 and gear 38 fixed to the main axle 18, the gear 38 being rotated in the counterclockwise direction. The planetary gears 35, 36 meshed with the gear 38 are rotated in the clockwise direction. Then, since the pivoting of the lock lever 9 in the counterclockwise direction is limited by means of the roller fitting hole 15 installed on the lock lever 9 and the roller 14 fitted thereinto, the lock lever 9 is fixed once it is pivoted through the predetermined angle. Hence, the planetary gears 35, 36 are rotated in the counterclockwise direction with the main axle 18 as a center since the inner tooth gear 22 does not rotate as well. The outer tooth gear 33 on which the planetary gears 35, 36 are provided rotated in the counterclockwise direction and thereby the loading ring 4 is rotated in the clockwise direction, that is to say, in the unloading direction.

It is noted that numeral 42 shown in FIG. 2 denotes a manual crank and the manual crank 42 is mounted on an upper end of the main axle 18. When the main axle 18 is rotated, the tape loading mechanism according to the present invention can be manually operated. Therefore, if a failure occurs in an electric system or the motor 2, the tape can be extracted.

The structure of the tape loading mechanism in the preferred embodiment is described above. When the motor 2 is rotated in one direction, the loading ring 4 is moved in the loading direction. When the loading ring 4 is brought into the position at which the tape loading is ended, the loading ring 4 is automatically locked by means of the lock mechanism 5.

After the end of the recording or playback of a tape, the motor 2 is reversely rotated. The lock mechanism 5 is operated upon the action of the planetary gears 17. The lock of the loading ring 4 by means of the lock mechanism 5 is released. When the lock of the loading ring 4 is released, the gear change action of the gear assembly 17 causes the loading ring 4 to rotate in the unloading direction. The unloading of the tape is, thus, carried out.

The structure of the lock mechanism is not limited to that in the preferred embodiment although the tape loading mechanism is constituted by the lock mechanism 5, trigger lever 7, and lock lever 9.

The following effects are provided according to the structure of the tape loading mechanism described hereinabove.

(1) Since neither worm gear nor worm wheel is used, the transmission efficiency of the rotating force of the motor can be enhanced, therefore the motor can be miniaturized and the power consumption can be reduced.

(2) Since a rubber belt is not used, durability is increased and easy maintenance can be achieved.

(3) Since the lock mechanism is used, the locking effect can be secured compared with constructions in which the locking function is effected by using a worm and worm wheel. In addition, rotation of the motor is switched by means of the operating force of the lock mechanism and rotating force of the loading ring. After the force of the motor is used to release the lock of the loading ring, the force of the motor can continuously rotate the loading ring in the unloading direction.

It will be fully appreciated by those skilled in the art that the foregoing description has been made in terms of the preferred embodiment and various changes and modifications may be made without departing from the scope of the present invention which is to be defined by the appended claims.

What is claimed is:

1. A tape loading apparatus in a chassis for drawing magnetic tape from a mounted tape cassette in which magnetic tape is wound around a circumferential surface of a tape guide drum comprising:

a loading ring on which a first pin is mounted so that said loading ring is stopped thereby at a first loading start position;

a second pin fixed relative to said chassis for stopping a rotation of said loading ring at a second position at which a loading operation is completed;

a motor;

means for transmitting rotation of said motor to said loading ring; and lock means having first and second levers for locking said first pin at a position where said first pin is engaged by the first and second levers, and at least one of said first and second levers contacts said second pin; wherein said transmitting means comprises an epicyclic train;

said second lever has a third pin which is engaged to said epicyclic train so that a rotation of said epicyclic train is limited thereby; and said epicyclic train comprises a first gear having a wall on which gear teeth are formed and having a slot engaged with said third pin on said second lever, and a second gear on which at least one planet gear is rotatably mounted, said second gear and said planet gear being engaged to said loading ring and said gear teeth of said first gear respectively, and a main shaft having gear teeth for engaging said first and second gears so as to drive same in response to rotation of said motor.

2. The tape loading apparatus according to claim 1, in which said first lever has a roller, and said second lever is energized to rotate in a predetermined direction and has an L-shaped hole for receiving said roller.

3. A tape loading apparatus in a chassis for drawing magnetic tape from a mounted tape cassette in which magnetic tape is wound around a circumferential surface of a tape guide drum comprising:

a lock means having first and second levers;

a loading ring on which a first pin is mounted so that said loading ring is stopped thereby at a first loading start position and so that said first pin contacts said first lever at an intermediate position between said first position and a second loading end position;

a motor;

first means for transmitting rotation of said motor to said loading ring; and a second pin fixed relative to said chassis for stopping a rotation of said loading ring at said second position wherein said loading ring is locked by pressing said first pin and said first lever on said second pin by means of said second lever; wherein said first lever has a pin contacting portion and said second lever has a pin pressing surface, such that said pin contacting portion is fixedly disposed between said second pin and said first pin and such that said first pin is fixedly disposed between said pin contacting portion and said pin pressing surface when said first pin is locked at said second position; and further comprising second means for transmitting rotation of said motor to said second lever wherein said first and second transmitting means comprise an epicyclic train; and said second lever has a third pin which is engaged to said epicyclic train so that a rotation of said epicyclic train is limited thereby, and in which said epicyclic train comprises a first gear having a wall on which gear teeth are formed and having a slot engaged with said third pin on said second lever, and a second gear on which at least one planet gear is rotatably mounted, said second gear and said planet gear being engaged to said loading ring and said gear teeth of said first gear respectively, and a main shaft having gear teeth for engaging said first and second gears so as to drive same in response to rotation of said motor.

4. The tape loading apparatus according to claim 3, in which said first lever has a roller, and said second lever has an L-shaped hole for receiving said roller.

* * * * *